Feb. 28, 1933.　　　　E. SCHMIDT　　　　1,899,114
MACHINE FOR MANUFACTURING DRY CELLS
Filed May 21, 1931　　　6 Sheets-Sheet 1

Fig. 1.

Feb. 28, 1933.  E. SCHMIDT  1,899,114
MACHINE FOR MANUFACTURING DRY CELLS
Filed May 21, 1931  6 Sheets-Sheet 2

Feb. 28, 1933.    E. SCHMIDT    1,899,114
MACHINE FOR MANUFACTURING DRY CELLS
Filed May 21, 1931    6 Sheets-Sheet 3

Feb. 28, 1933.     E. SCHMIDT     1,899,114
MACHINE FOR MANUFACTURING DRY CELLS
Filed May 21, 1931     6 Sheets-Sheet 4

Feb. 28, 1933.  E. SCHMIDT  1,899,114
MACHINE FOR MANUFACTURING DRY CELLS
Filed May 21, 1931   6 Sheets-Sheet 5

Fig. 9.

Feb. 28, 1933.  E. SCHMIDT  1,899,114

MACHINE FOR MANUFACTURING DRY CELLS

Filed May 21, 1931  6 Sheets-Sheet 6

Fig. 12.

Patented Feb. 28, 1933

1,899,114

UNITED STATES PATENT OFFICE

EDMUND SCHMIDT, OF BERLIN-TEMPELHOF, GERMANY

MACHINE FOR MANUFACTURING DRY CELLS

Application filed May 21, 1931, Serial No. 539,017, and in Germany July 15, 1930.

This invention relates to a machine for manufacturing dry cells, in which particularly the closing of the zinc cups with paper covers or the like, the fitting of the caps on the carbon rods and the soldering of the pole wires on to the zinc cups is effected absolutely mechanically, excluding all hand work.

This is obtained according to the invention chiefly in that on the two sides of a common conveying device for the individual cells devices are arranged for placing the covers on the zinc cups, for capping the carbon rods and for soldering the pole wires on to the zinc cups, to which devices the cells are automatically fed in uninterrupted succession by means of the conveying device. In this manner a considerable acceleration of the entire operations is obtained, besides increased precision and cheapening in the construction. Further according to the invention the individual devices are improved, so that an automatic carrying out of all the manufacturing proceedings is rendered possible, without interruptions in the work. Thus, according to the invention, for putting the covers on the zinc cups beside the conveying path moved in straight line the following devices are arranged successively: a centering device for centering the carbon rods in the zinc cups, a combined arrangement for stamping and then immediately placing the cover on the fed cells, and a device for pressing the loosely applied covers into the zinc cups. The stamping device is further provided with a punch for cutting the central aperture in the closing covers, so that, when unprepared covering material is used, the covers can be stamped out therefrom and directly placed on the cells by the same punch. By this arrangement it is therefore possible, to avoid all manual labour when covering the cells and consequently to effect a considerable acceleration of the entire covering operation, which represents at the same time a considerable saving in the cost of production, especially in view of the easy introduction in the completely automatic carrying out of the ordinary operations.

In order to provide the carbon rods of the carbon electrode with the necessary current conducting metal cup on which the pole wires can be soldered, an automatically operating device is provided, in which the metal caps slide from a magazine by means of a mechanical sorting arrangement into a feed chute and properly sorted according to their position, come in front of two dies arranged one on each side of the conveying device. These dies are positively movable in opposite directions so that the one pushes the cap and the other the zinc cup containing the carbon electrode towards one another, the carbon electrodes being brought periodically between the pressing dies according to the movement of the dies by the rectilineally moved conveying device.

For soldering the pole wires on to the zinc cups of the covered and capped cells a device is employed, which has an intermittently rotatable conveyor disc, on to which the cells are shifted in pairs by the common rectilineal conveyor and by means of which they are fed to the different parts of the soldering device, which effect the moistening with flux of the points to be soldered, the application and cutting of the pole wire to be soldered and the feeding and fusing of the solder by means of positively moved soldering irons. The pole wire to be soldered on is first fed by means of a separate device parallel to the longitudinal axis of the dry cells, is cut to the required length, and subsequently the sections cut off are brought in this position to the soldering device together with the cells belonging thereto, for the purpose of being soldered on. Thus, the operation of bending the pole wires, which is otherwise necessary, is saved, resulting in a simultaneous saving in labor and cost of production. Further the throw-outs caused by breaking of the pole wires during the bending operation are avoided. By further suitable measures, such as the construction of the feeding device of the conveying device in such a manner that a plurality of cells are always fed at the same time, moistened with flux, provided with pole wires and soldered, it is possible by employing this new working method to obtain a further increase in output.

An embodiment of the invention is illustrated by way of example in the accompanying drawings in which:—

Figure 1:
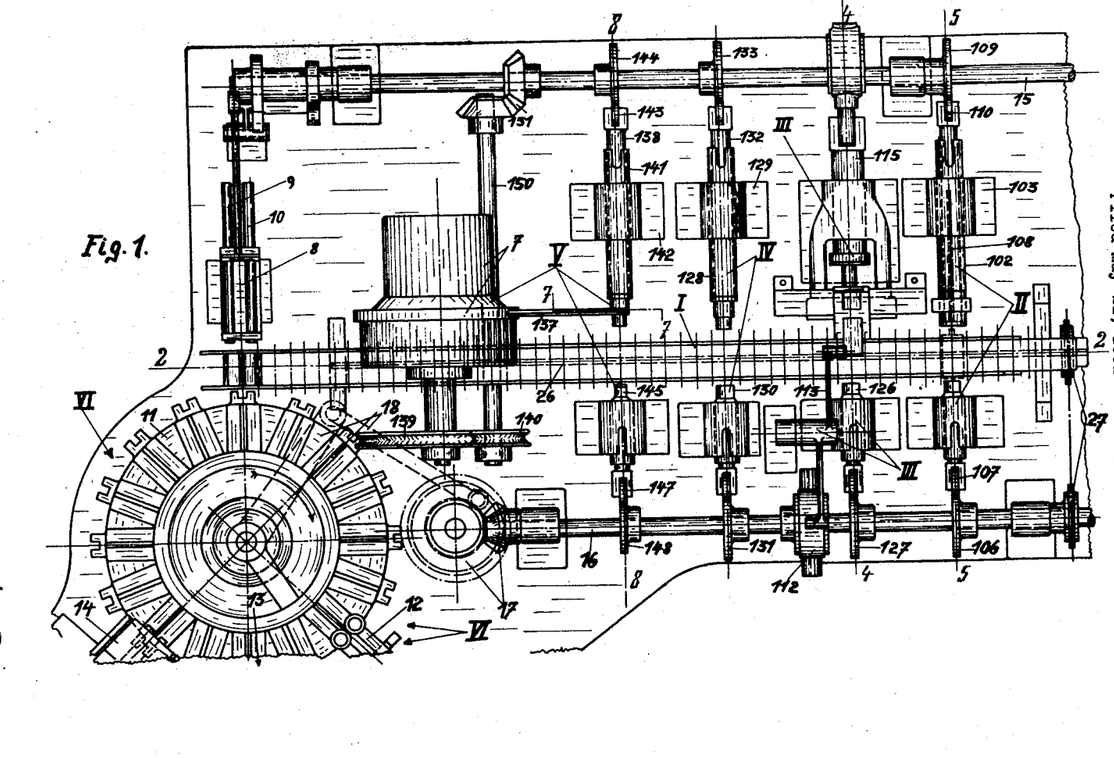
Fig. 1 shows the entire arrangement in top plan view.

The arrangement consists substantially of a conveyor I, on each side of which a centering device II, a cover stamping and fitting device III, a cover pressing in device IV, a capping device V and a soldering device VI are arranged. The cells placed automatically or by hand on the conveyor I are fed successively by this conveyor to the centering device II, which centers the carbon rod accurately in the zinc cup, before the application of the cover. Each cell is then fed by the conveyor to the device III, which stamps out closing covers, for example from a cardboard strip fed thereto, and places same on the carbon rod or the zinc cup. The loosely applied covers are then pressed tightly into the zinc cups by means of the device IV. The conveyor I then brings each cell in front of the capping device V, where the metal caps coming from a sorting drum 7 are pressed on to the carbon rods. At the end of the conveyor I a feeding device 8 having two rams 9 and 10 is arranged, by means of which the cells, as they arrive, are pushed in pairs on to a conveyor disc 11 intermittently rotating in the direction of the arrow. The conveyor 11 feeds the cells in pairs first to a device 12 for moistening with flux the points to be soldered. After the moistening of the points to be soldered, the cells are fed by the conveyor disc 11 to a device 13, by means of which the pole wires to be soldered on are pushed on to the soldering points and cut off to the desired length. The cells are then conveyed with the pole wires held in the proper position in front of a soldering device 14 proper, by means of which the pole wires are also automatically soldered on to the zinc cups. After the soldering on of the pole wires, the cells are removed mechanically or by hand from the conveyor disc and delivered to a storage container or to a machine for further treatment.

The drive of all the devices and rams is effected by means of shafts 15 and 16, on which cams are fixed in suitable manner for effecting the reciprocating movement. The drive of the conveyor disc 11 is effected by bevel wheels 17 and connecting rods 18 which rods 18 operate a pawl and ratchet mechanism of any known and suitable kind, to impart an intermittent rotary movement to the conveyer plate 11. The drive of the devices 12, 13 and 14 arranged around the conveyor disc 11 is also effected by the pair of bevel wheels 17 in known manner through the intermediary of suitable chains 19. In order to ensure that all movements are positively effected, the main driving shafts are coupled together, for example by a transverse shaft fitted with pairs of bevel wheels (not shown).

Figure 2:
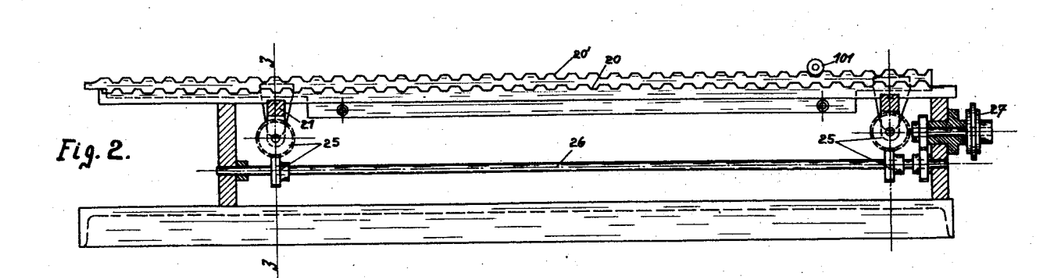
Fig. 2 is a section through the conveyor on line 2—2 of Fig. 1.
Figures 3, 4:
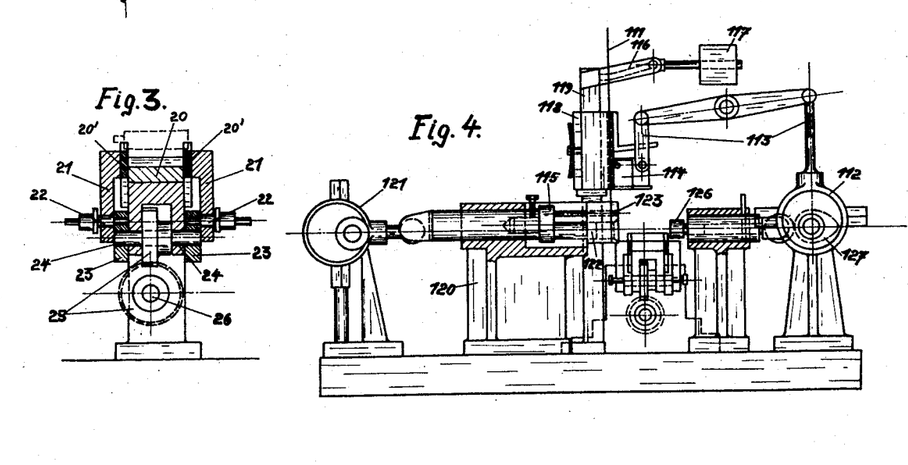
Fig. 3 is a section through the conveyor on line 3—3 of Fig. 2, on a larger scale.
Fig. 4 is a section on line 4—4 of Fig. 1.

The conveying device I consists of a rigid part 20 and of a movable part 20' extending from the rigid part 20. This movable part 20' slides on the outer surfaces of the part 20 and is mounted on arms 21 (Fig. 3). These arms are oscillatably mounted on crank pins 22. The crank pins 22 are screwed into rotatable discs 23 which are keyed on an axle 24. The axle 24 can be rotated together with the discs 23 and the crank pins 22 by means of a pair of gears 25 and a shaft 26. During the movable portion 20' the conveying device performs a circular movement, during which it is at the same time raised and shifted in one or other direction according to the direction of rotation of the discs 23 and is again lowered during the second half of the feeding movement. The width of the middle stationary portion 20, on which the cells first rest, is such that the carbon rod or the ends of the cell project on both sides beyond the stationary part 20 (Fig. 3). During the swinging up of the part 20', owing to the turning of the crank, the part 20', which during its oscillating movement lies now above and then below the level of the part 20 according to the position of the crank pins, lifts the ends of the cells resting on the part 20 and at the same time moves same forwards to again deposit them on the part 20 at the end of the forward movement during the descending below the level of the part 20, but at a point advanced by the length of the stroke. Thus, during the working of the machine the cells are successively lifted, moved forward and again deposited, so that a continuous forward conveying of all the cells occurs at the same time so that the positive conveying is ensured with the corresponding operations of the devices arranged on both sides of the conveyor. In order to ensure the length of feed of the cells and to prevent slipping of the cells after they have been deposited on the stationary part 20, both the part 20 and also the movable part 21 are constructed in rack-shape, the tooth pitch corresponding to the crank stroke or to the feed per stroke. The driving of the device, as above mentioned, is effected by the shaft 26 and the worm wheels 25, the shaft 26 been driven from the shaft 16 through the intermediary of sprocket wheels 27.

Figure 5:
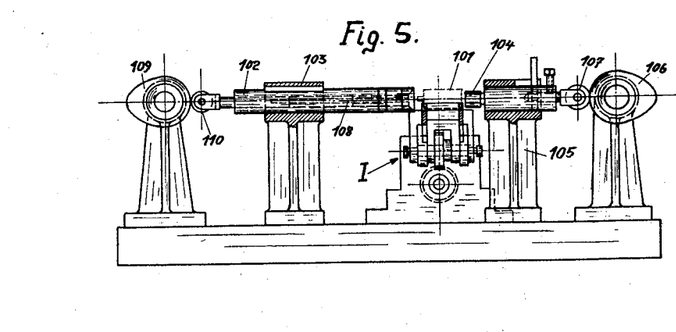
Fig. 5 is a section on line 5—5 of Fig. 1.

The device for applying the covers comprises substantially the centering device II, the stamping and applying device III and the pressing in device IV. The cells 101 are fed by the intermittently moved conveyor I first to the centering device II (Fig. 5). This device consists of a centering die 102, rigidly mounted in a bearing 103. The end of a ram, which is opposite to the conveying device, has one large and one small conical aperture, in which the cell cup and the carbon electrode respectively fit loosely. With the aid of an oppositely arranged ram 104 shiftably mounted in a bearing 105 and reciprocated by means of a cam 106 and a roller 107 this cell is pushed forward at a certain moment, that is as soon as the cell 101 is opposite the ram 104 and the cell is pressed against the rigid centering die 102, so that the carbon rod is accurately centered relative to the zinc cup and also this cup itself. A mandrel 108 is arranged axially shiftable in the rigid centering die 102. This mandrel is pushed forward by a cam 109 and a roller 110 after the moving back of the ram 104, when it comes into contact with the carbon electrode and pushes the cell 101 out of the centering die and back on to the conveying device; the conveying device then feeds the cell to the stamping and applying device III.

Figure 6:
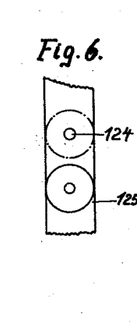
Fig. 6 shows on a larger scale a portion of the strip to be stamped.
Figure 8:
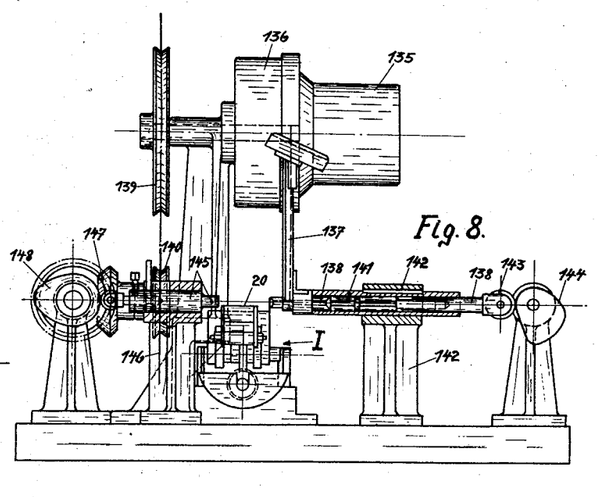
Fig. 8 shows the capping device in section on line 8—8 of Fig. 1.

The cover material is fed to the stamping device in form of a strip 111, which is intermittently fed towards the die 115 by means of an eccentric 112 and a lever mechanism 113, which presses by means of a block 114 against the strip 111. The block, which presses against the strip according to the movement of the eccentric and the lever, shifts the strip and then releases same and ascends again. Slipping back of the strip 111 is prevented by an elbow lever 116 with a weight 117. The block 114 is mounted in a casing 118, which reciprocates on a prismatic guide 119 according to the movement of the lever system 113. The die 115 is axially shiftable in a bearing bracket 120 and is reciprocated by means of an eccentric 121. The punches 122 and 123 are mounted on the die 115, the punch 123 corresponding to the hole diameter for the electrode of the cell, whereas the punch 122 corresponds to the diameter of the cover. Consequently the punching of the hole 124 (Fig. 6) for inserting the electrode and of the cover 125 is always effected at the same time with the difference that the electrode hole stamped out by the punch 123 is designed for the next following cover to be applied or to be stamped out. The actual punching and applying die 122 therefore always stamps out an already punched disc, which consequently can be easily applied on the cell fed by the conveying device. The cell is moreover, as in the previous instance, pressed by an axially shiftable ram 126 actuated by an eccentric 127 against the punching die 122 or the stamped out cover disc at a suitable moment. The cell with the cover disc loosely placed therein is then fed to the pressing in device IV, which is constructed and operates in a substantially similar manner as the centering device II. In this instance also a ram or counter bearing 128 is rigidly mounted in a bearing 129. The cell is pressed with the slipped on cover against the die 128 by means of the axially shiftable ram 130, which latter is actuated by means of a cam 131. Thus, the foremost part of the counter bearing 128 provided with an aperture slides into the zinc cup of the cell and presses the cover disc tightly on to the electrolytic mass. When the inserting has been completed, the cell is pushed back on to the conveyor by means of a ram 132, which is actuated by a cam 133. The conveying device then brings the cell to the next operating device V, by means of which the caps are placed on the carbon rods. Fig. 8 shows the capping device partly in section. The sorting device 7 consists substantially of a magazine 135 and the sorting drum 136 proper.

Figure 7:
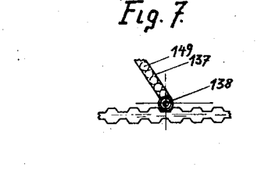
Fig. 7 is a part section on line 7—7 of Fig. 1.

The caps 149, which are accommodated in the magazine 135, are sorted by means of a sorting drum 136 according to their position and fed into an inclined chute 137, in which they are guided by gravity closely following the one behind the other in front of a pressing ram 138 (Fig. 7). The driving of the sorting drum 136 is derived from the main shaft 15 by means of grooved pulleys 139, 140, shaft 150 and a pair of bevel wheels 151. The pressing ram 138 is axially shiftable in a counter-bearing 141, rigidly keyed in a bracket 142. The diameter of the cap ram 138 corresponds at its front portion to the diameter of the caps. The rear portion is provided with a roller 143, which coacts with a cam 144, by means of which the movement is imparted to the ram 138. The cam 144 is keyed also on the shaft 15.

Opposite the ram 138 a ram 145 is arranged, which pushes the carbon electrodes with their carbon rods against the cap ram or the sheet metal cap. The carbon electrode ram 145 is axially shiftable in a bracket 146 and also carries at its rear end a roller 147, which coacts with a cam 148 and is actuated thereby. The cam 148 is keyed on the shaft 16. Between the two rams 138 and 145 the conveying device I is arranged, by means of which the capped cells are fed to the soldering device VI.

Figure 9:
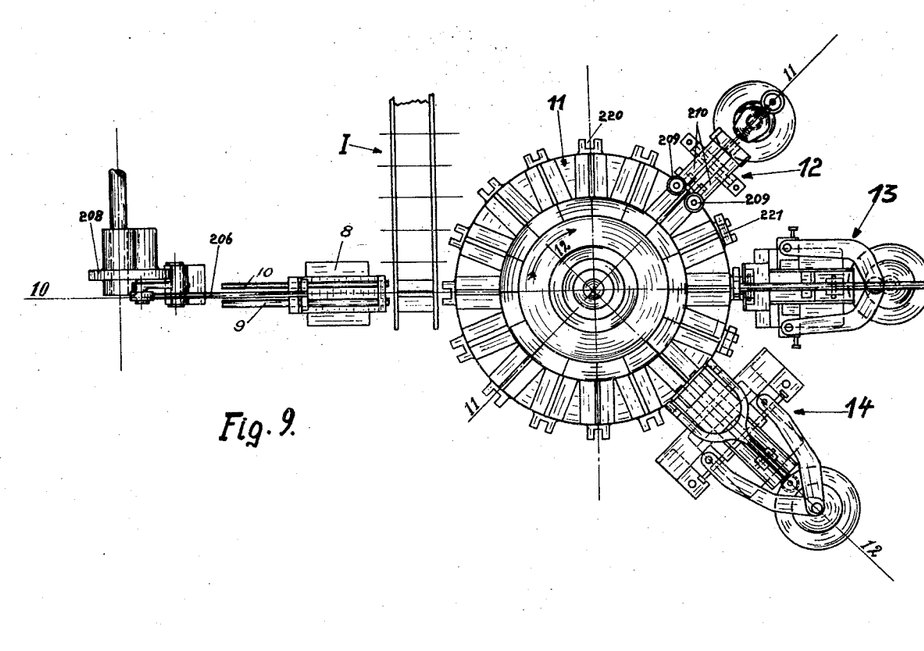
Fig. 9 shows the soldering device in top plan view.
Figure 10:
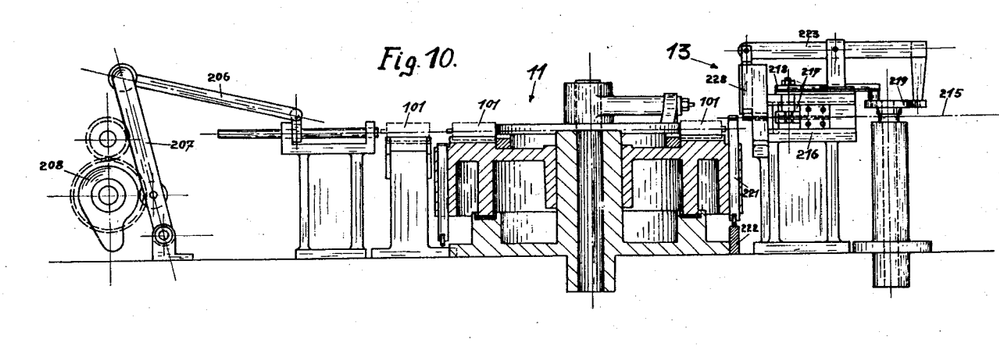
Fig. 10 shows the soldering device on a larger scale in section on line 10—10 of Fig. 9.
Figure 11:
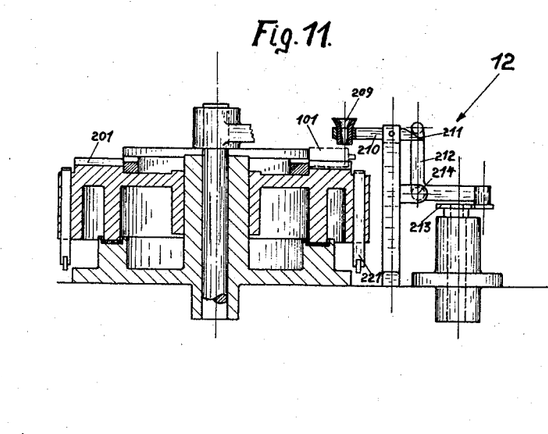
Fig. 11 is a part section on a larger scale on line 11—11 of Fig. 9.

The soldering device consists substantially of the conveyor disc 11, the moistening device 12, the pole wire feeding and cutting off device 13 and the soldering device 14 proper. The conveyor disc 11, which is intermittently rotated by some suitable known means has recesses 201 arranged in pairs in the example illustrated and serving to accommodate the dry cells 101. The pairs of recesses are arranged at regular intervals around the disc. The feeding of the dry cells onto the disc is also effected by means of the conveying device I, which brings the cells in front of the disc 11. At the side of the conveying device I two rams 9 and 10 are shiftably mounted in a bracket 8 and reciprocated simultaneously by means of a connecting rod 206, a lever 207 and a cam 208 (Fig. 10). The driving mechanism for the cam disc and therefore of the pair of rams 9 and 10 is positively coupled to the intermittent movement of the disc 11 and conveying device I, so that two cells are always simultaneously pushed on to the conveyor disc 11 into two juxtaposed recesses 201 by the pair of rams 9 and 10 at the correct moment, that is as soon as a pair of recesses 201 registers with the pair of rams 9 and 10. The cells pushed on to the conveyor disc 11 are first fed in pairs to the moistening device 12 in the direction of the arrow according to the rotation of the conveyor disc (Fig. 11).

The moistening device 12 is also duplicated and consists of two small funnels 209, each provided with a wick steeped in flux and fixed on a two-armed lever 210. An elbow lever 212, which is oscillated around its pivot 214 at the moment, when a pair of cells is situated under the funnels 219 presses against the rear bevelled end 211 of this pair of levers 210. Thus, the funnels 209 are lowered with the wick steeped in flux on to the zinc cups, moisten these with acid and then again rise. The disc 11 thereupon moves on and feeds the pair of moistened cells to the pole wire feeding and cutting off device 13. (Fig. 10.)

Figure 12:
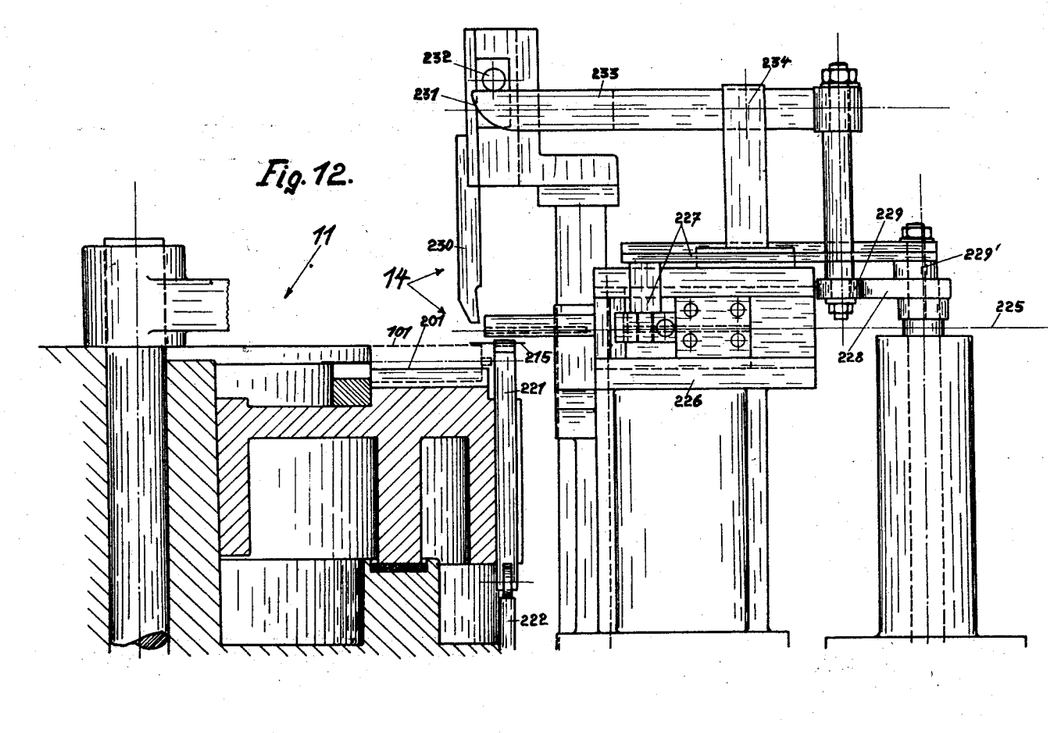
Fig. 12 is a section through the soldering device on a larger scale on line 12—12 of Fig. 9.

The pole wire 215 is fed from a storage drum, not shown in the drawings, by the feeding device. This consists of a stationary base plate 216, on or in which a tongs-like constructed upper part 217 is shiftably mounted. The jaws of the tongs are formed by two eccentrically oscillatable blocks 218. This tongs-like upper part is reciprocated on the base plate 216 by a cam 219. During the forward movement in the direction of the conveyor disc 11, the blocks 218 grip the wire and feed it according to the stroke of the cam 219, a corresponding length of wire being unwound from the storage drum. During the return movement of the tongs 217 the blocks 218 release the wire, so that the advanced end retains its position. In order to ensure a reliable guiding of the pushed out end and to prevent same from sinking, slides 221 are provided in corresponding grooves 220 on the end face of the conveyor disc 11, the heads of these slides being provided with slots for accommodating the pole wires. The lower ends of these slides run, during the intermittent rotation of the transport disc 11, on the section between the wire feeding device 13 and the soldering device 14 on a cam 222 arranged below the conveyor disc 11 within the range of the above mentioned devices. Therefore, as soon as a pair of cells approaches the pole wire feeding device 13 with their corresponding slide 221, the slide 221 in question is raised by running on to the cam 222 and finally arrives with its incisions on the same level with the pole wire 215, which lies in the incision of the slide head during the feeding. The pole wires are fed in pairs corresponding to the pair of cells. The feeding device or the tongs 217 are constructed in such a manner that during each stroke two wire ends 215 are simultaneously fed and rest in the incisions of the raised slide head. A pair of knives 224 is actuated by the same cam 219 through the intermediary of a lever 223 in such such a manner that, after the termination of the feeding of the wire ends, this pair of knives is moved downwards and consequently the wire ends are cut off. After the return movement of the knife or after the cutting off of the wire ends, the conveyor disc 11 moves on and brings the pair of cells 101 in front of the soldering device 14 (Fig. 12). The soldering device has also a wire feeding device for the solder wire 225, which is constructed substantially similar to the pole wire feeding device, with the difference that the feed of the wire is less long and the feeding blocks are arranged at a greater distance apart, corresponding to the thicker wire diameter. Also in this instance a tongs-like constructed upper part 227 is adapted to be reciprocated by means of a cam 228 on a stationary base plate 226 in such a manner, that only a short length of soldering wire 225 is fed according to the shorter stroke imparted to the pin 229 on the cam disc 228. Also in this instance the feeding device is duplicated, so that always two wire ends 225 are fed from storage drums. Soldering irons 230 are arranged above the projecting wire ends, shiftable in a guide 231. The irons 230 normally bear by means of pins 232 on one end of a two-armed lever 233 oscillatable on an axle 234 by means of the cam disc 228 and the roller 229'. The lever 233 is shown in its extreme upper position in the drawings. As soon as the cam 228 moves on, the front end of the lever descends with the pair of soldering irons 230 so that the soldering irons first come into contact with the projecting ends of the solder wires and are prevented thereby from further descending, whereas the lever 233 continues to descend, so that a gap is produced between the pins 232 and the end of the lever 233. The soldering irons 230 heated by gas or electrically melt the projecting end of the solder wire which remains adhering to the point of the soldering irons in the form of a drop of comparatively large size. As soon as the solder wire ends have melted, the soldering irons drop by gravity on to the zinc cups with the solder on their points and solder on the zinc cups the pole wire ends 215, held in the correct position and height by the slides 221. In the meantime the front portion of the lever 233 rises according to the cam movement and again lifts the soldering irons 230 by engaging under their pins 232.

The soldering operation is then terminated and the cells provided with covers, caps and pole wires can be fed by the conveyor disc 11 either to a storage receptacle or to other working devices.

I claim:—

1. A machine for producing dry cells, comprising in combination a transporting device for the cells, a device for centering the carbon rods relative to the cell cups, a device for intermittently feeding the cover material in strip form, a punch for stamping the central aperture of the cover, a second punch arranged at the side of said first mentioned punch for punching the closing covers from the strip of material, an eccentric for moving both said punches in common and simultaneously, a ram arranged coaxially to said second punch on the opposite side of said transporting device adapted to push cell cups towards said second punch for receiving the stamped out cover, a cam adapted to actuate said ram, a device for pressing the covers into the cell cups, a device for pressing the cups on to the ends of the carbon electrodes, a device for soldering the pole wires on to the zinc cups of the dry cells, and means for driving all of said devices.

2. A machine for producing dry cells, comprising in combination a conveying device for the dry cells, a device for centering the carbon rods relative to the cell cups arranged on one side of said conveying device, a device for stamping and applying the covers on the cell cups, two dies coaxially arranged one on each side of said conveying device for pressing the covers into the cell cups, cams adapted to actuate said dies, devices for sorting and pressing the metal caps on the free ends of the carbon electrodes, a device for soldering the pole wires on the zinc cups of the dry cells, and means for driving these dies and devices.

3. A machine for producing dry cells, comprising in combination a conveying device, a device for centering the carbon rods relative to the zinc cups, a device for stamping and applying the covers on the zinc cups, a device for pressing the covers into the zinc cups, a magazine for the metal caps to be pressed onto the carbon rods, a sorting drum for sorting the metal caps dropping thereon from said magazine, an inclined guide chute adapted to sort the metal caps according to their position as they slide down said chute by gravity, a movable pressing ram arranged on one side of said conveying device adapted to press the caps fed by said chute onto the free end of the carbon rods, a cam adapted to actuate said ram, a second ram arranged coaxially to said first ram on the other side of said conveying device, a second cam adapted to actuate said second ram in the counter direction to said first ram, a device for soldering the pole wires on the zinc cups of the cells, and means for driving said rams and said devices.

4. A machine for producing dry cells, comprising in combination a conveying device for the dry cells, a device for centering the carbon rods in the cell cup arranged at the side of said conveying device, a device for stamping and applying the covers on said cups, a device for pressing the covers into the cell cups, a device for pressing the metal caps on the carbon electrodes, an intermittently rotatable conveyor disc arranged beside said conveying device, rams for automatically shifting the cells from said conveying device onto said conveyor disc, a cam for actuating said rams, a device for moistening with flux the points to be soldered of the zinc cups, a device for feeding and cutting the pole wires to be soldered onto the cups, a device for feeding and melting the solder wire, said moistening device, said pole wire feeding and cutting device and said solder wire feeding and melting device arranged around said conveyor disc, and means for driving said devices.

5. A machine for producing dry cells, comprising in combination a conveying device for the dry cells, a device for placing the cover on the zinc cups, a device for capping the carbon rods, an intermittently rotatable conveyor disc beside said conveying device, a device for pushing the covered and capped cells from said conveying device onto said conveyor disc, levers arranged above said conveyor disc, a wick steeped in flux on each of said levers, devices for lowering said wicks onto and for raising said wicks from said zinc cups, a tongs-like arrangement at the side of said conveyor disc for intermittently feeding the pole wire from a storage drum parallel to the longitudinal axis of the cell cups, a device for cutting off the lengths of pole wire fed, a soldering device arranged at the side of said conveyor disc adapted to solder the pole wires onto the cell cups, and means for actuating said devices.

6. A machine for producing dry cells, comprising in combination a conveying device for the cells, a device for closing the cell cups, a device for capping the carbon electrodes, a conveyor disc arranged at the side of said conveying device, a device for moistening the zinc cups with flux, a device for feeding and cutting off the pole wire to be soldered onto the cups, a device for holding the pole wire lengths fed to the zinc cups in position during the conveying of the cells, a tongs-like device for intermittently feeding the solder wire, soldering irons adapted to slide by gravity onto the solder wire and to the soldering points, guides for guiding said soldering irons, and means for actuating said devices.

7. A machine for producing dry cells, comprising in combination a device for closing the cell cups, a device for capping the carbon electrodes, a device for soldering the pole wires on the zinc cups, a stationary rack for supporting the cells arranged beside said devices, an oscillatably movable rack arranged beside said stationary rack, adapted to lift the cells from and to again deposit the cells on said stationary rack at a point corresponding to the pitch of the teeth of said stationary rack, a cam for actuating said oscillatable rack, and means for driving said devices.

In testimony whereof I affix my signature.

EDMUND SCHMIDT.